United States Patent
Bert

(10) Patent No.: US 12,197,754 B2
(45) Date of Patent: Jan. 14, 2025

(54) RANDOM STORAGE ACCESS AND DATA ERASURE FOR IMPROVED PERFORMANCE AND REDUCED WRITE AMPLIFICATION

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/337,873

(22) Filed: Jun. 20, 2023

(65) Prior Publication Data

US 2024/0028231 A1 Jan. 25, 2024

Related U.S. Application Data

(60) Provisional application No. 63/390,938, filed on Jul. 20, 2022.

(51) Int. Cl.
*G06F 3/06* (2006.01)
(52) U.S. Cl.
CPC ............ *G06F 3/064* (2013.01); *G06F 3/0656* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | |
|---|---|---|
| 2019/0004736 A1 | 1/2019 | Lee et al. |
| 2020/0257620 A1 | 8/2020 | Longnos et al. |
| 2021/0191850 A1 | 6/2021 | Subbarao et al. |
| 2023/0289078 A1 | 9/2023 | Wells et al. |
| 2024/0028230 A1 | 1/2024 | Bert |

*Primary Examiner* — Kevin Verbrugge
(74) *Attorney, Agent, or Firm* — Greenberg Traurig

(57) ABSTRACT

A host system to query, during booting up of the host system, a superblock size in a connected memory sub-system. The host system can place write requests into separate streams and send the streams to the memory sub-system to store data of the write requests into separate sets of superblocks for the streams respectively. The host system can allocate, a plurality of log buffers for the streams respectively and record, into the log buffers, sequences of logical addresses as in the streams respectively. The host system can trim a stream, among the plurality of streams, by issuing commands to the memory sub-system to erase, according to the superblock size, an amount of data from a portion of a sequence of logical addresses recorded in a log buffer for the stream, causing the memory sub-system to free at least one superblock.

20 Claims, 9 Drawing Sheets

RANDOM STORAGE ACCESS AND DATA ERASURE FOR IMPROVED PERFORMANCE AND REDUCED WRITE AMPLIFICATION

RELATED APPLICATIONS

The present application claims priority to Prov. U.S. Pat. App. Ser. No. 63/390,938 filed Jul. 20, 2022, the entire disclosures of which application are hereby incorporated herein by reference.

TECHNICAL FIELD

At least some embodiments disclosed herein relate to memory systems in general, and more particularly, but not limited to data placement for improved performance and reduced write amplification.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
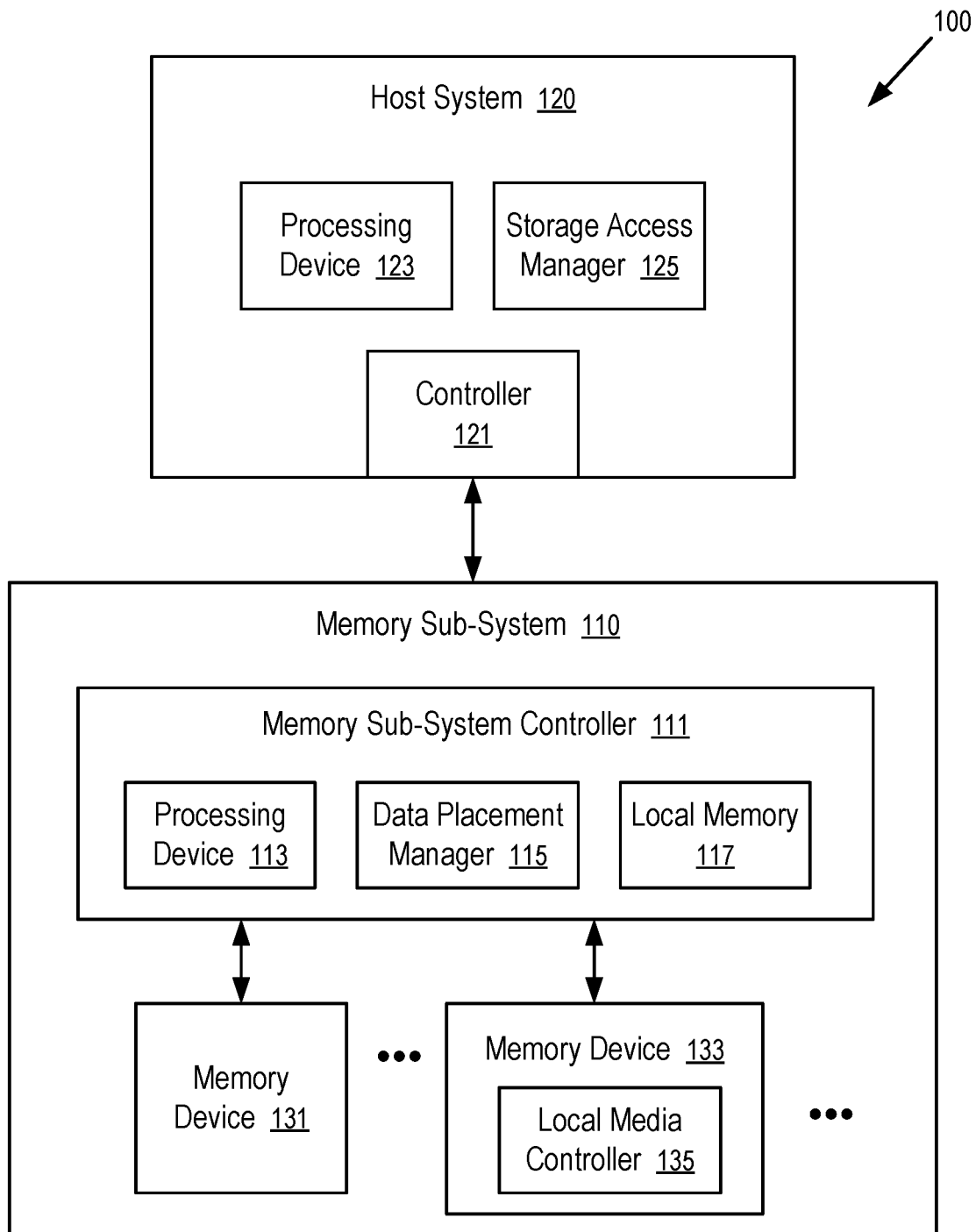
FIG. 1 illustrates an example computing system that includes a memory sub-system in accordance with some embodiments of the present disclosure.

At least some aspects of the present disclosure are directed to data placement in a memory sub-system for reduced write amplification and improved performance.

In general, a memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Over the last few years, a number of new data placement methods have been added to the non-volatile memory express (NVMe) standard to improve data placement, optimize performance, and reduce write amplification. Such methods can involve zone namespace (ZNS), and/or flexible direct placement (FDP) and thus require profound changes to host software and/or storage devices (e.g., solid-state drive (SSD)). As a result, it may take 5 to 10 years for the technologies to mature to a level for mass deployment.

At least some aspects of the present disclosure address the above and other deficiencies by mapping writes in a stream over superblocks to emulate zones. When such a method is used, current host systems and solid-state drives can be configured with minimal modifications to provide many of the advantages of ZNS, without having to incur the profound changes required to implement ZNS.

To map writes in a stream over superblocks, the host system (e.g., operating system running in the host system) can be configured to support streams, write sequentialization within each stream, and a protocol to obtain information on superblocks in a memory sub-system (e.g., solid-state drive (SSD)). For example, a communication protocol can be implemented to allow the host system to query the memory sub-system for the size of superblocks in the memory sub-system.

When a host system is configured to write sequentialized data in a stream, the memory sub-system can store data in a sequential pattern for improved performance. Further, the memory sub-system can allocate superblocks to store the sequentialized data in the stream to mimic zoned write pattern, and to obtain the benefits of the controlled garbage collection and block erasure within a boundary. Such benefits are not available to conventional solid-state drives (SSDs).

In one implementation, the host system creates streams to write data into the memory sub-system. Related data that are liked to be used together and/or erased together can be grouped into a stream. The memory sub-system maps the addresses used to write data via the stream to superblocks. A superblock can be allocated for write and erased for reuse without write amplification. The memory sub-system can dynamically allocate a set of superblocks to store data for a stream in a way similar to the use of zone in a namespace to store a stream. However, the memory sub-system can allocate on the superblocks for a stream on the fly without knowing a predetermined size of storage space allocated to the stream and/or without knowing the size of the stream. In contrast, when a zone is used according to the protocols of ZNS, the zone has a predefined size; and the host system has to manage rollover of stream data from the current zone to the next zone when the stream size grows to exceed the size of the current zone. When the memory sub-system can dynamically allocate superblocks for a stream, the task to be performed by the host system can be simplified.

Superblocks can be written sequentially or randomly, while protocols of ZNS write data into zones sequentially. Thus, the dynamic mapping of a stream to superblocks offers the flexibility of random writes. When sequential writes are used, the write performance can be improved.

In one implementation, the host system is configured via software (e.g., operating system) to serialize data into selected streams and write them to a memory sub-system (e.g., solid-state drive) using existing write commands. The memory sub-system can be configured to maintain a dedicated cursor identifying a superblock assigned to a stream and write data sequentially on it. When the superblock is full, the memory sub-system can move to the next available superblock and continue the stream there, without any support from the host system, making it much simpler to manage. The host system can read data from the memory sub-system using the existing read commands without changes.

Erasing a superblock in its entirety has the benefit of not creating issues of garbage collection and the benefit of not increasing write amplification. The host system and the memory sub-system can be configured to communicate some characteristics of superblocks in the memory sub-system to the host system. For example, the superblock size can be provided from the memory sub-system to the host system (or via a configuration parameter in the host system) to assist the host system in issuing commands that erase a superblock in its entirety. For example, the host system can read the superblock size from the memory sub-system at the boot time.

When the host system decides to reclaim a portion of the storage space previously written into the memory sub-system, the host system can issue commands to cause at least one superblock to be erased in its entirety.

For example, when the host system has no information on the starting address of a superblock, the host system can issue commands to erase a contiguous segment of a stream having a size that is no smaller than twice the superblock size. As a result, at least one superblock can be erased in entirety for use by a stream, regardless of the placement of the segment on superblocks allocated for the stream. For example, the host system can issue trim/deallocation commands for the sequential logical block addressing (LBA) addresses used for writing the segment of data. For example, the host system can issue a command to erase data from a starting LBA address to an ending LBA address to cause the memory sub-system to reclaim entirely erased superblocks. When the segment is aligned with superblock boundaries, the commands cause two superblocks to be erased in their entirety; and the two superblocks can be reclaimed for use for a stream. When the segment is aligned with superblock boundaries, one superblock is erased in entirety, but two superblocks are partially erased. The partially erased superblocks are not reclaimed until they are erased in entirety. Such an approach may appear to result in excessive erasing. However, such an approach is fine, since the host system can monitor the storage space unionization rate of the memory sub-system; and if more space is needed, the host system can erase more data to cause the one of the partially erased superblocks to be completely erased and thus reclaimed.

Such an implementation can result in many advantages in ways very similar to ZNS (though much more restrictive). For example, such advantages can include the use of streams to group data for storing in an area in the memory sub-system, write sequentializations for improved write performance, data erasure with reduced write amplification and reduced garbage collection issues, lower over provisioning requirements, etc.

Sequentialization of data in the host system can be an expensive and/or complicated operation in some applications. When a host system does not write data sequentially at LBA addresses in a stream, the stream can still be mapped to superblocks as discussed above.

To facilitate the erasure of an entire superblock worth of data, the host system can keep track of the sequence of LBA addresses of writes that have been sent to the stream and deallocate the segment of data that has a size twice the superblock size.

In one implementation, the host system is configured to erase data in a way that causes superblocks to be reclaimed without further garbage collection operations. To support a method for superblock erasure, the host system can be configured to log the sequences of LBA addresses that are being written in different streams. For example, the host system can record in a non-volatile medium LBA addresses being written via streams and in the order they are written.

For example, a log buffer with a tail pointer can be used for a stream. The pointer starts at the beginning of the buffer; and, once a write command is sent in the stream to the memory sub-system, the host system can log at the location identified via the tail pointer the starting location of LBA addresses for the write command and the range of the LBA addresses written by the write command. The tail pointer is updated after logging the LBA addresses of the write command. Thus, the log buffer contains a stack of LBA addresses, starting from the beginning of the buffer and terminating according to the tail pointer. The buffer can be sized based on how much data the stream may contain/retain; and, once full, the log buffer can become circular and reuse the space below the head and behind the location of the tail pointer. In this way, the tail pointer can continue to move as the stream continues to grow, while data at the LBA addresses previously used in the stream ahead of the tail pointer can be erased to limit the storage space used by the stream. Each stream can have a separate log buffer having a different size.

When a block needs to be erased, the host system can send commands to the memory sub-system to erase data from a sufficient number of LBA addresses to cause the erasure of an entire superblock. For example, the host system can select, from the sequence of the LBA addresses recorded in the log buffer, a continuous sequence of LBA addresses recorded in the log buffer so that at least twice the amount of data that can be stored in a superblock is erased to ensure at least one superblock is erased in entirety. When a superblock is erased in entirety, it can be reclaimed as a free superblock and reused without garbage collection operations (e.g., moving data from the superblock prior to reusing the superblock).

When a stream uses LBA addresses sequentially, the host system can track the range of LBA addresses being used for the stream. When the storage space being used for the stream reaches a limit, the host system can start to erase data of the stream from the beginning of the LBA address range used for the stream. For example, two times the superblock size of data of the stream can be erased from the starting LBA address of the stream to reduce the size of data of the stream stored in the memory sub-system to make at least one superblock available for reused without garbage collection operations (e.g., moving data from the superblock prior to reusing the superblock). Thus, at the stream continuous, the starting LBA address for the LBA address range can move higher. Optionally, a log buffer can be used to track the range of LBA addresses used for a sequential stream.

To trim a stream, the host system can replay the log of LBA addresses recorded for a stream, starting from the position identified by a head pointer and towards the position identified by a tail pointer. The head pointer identifies the beginning of the sequence of LBA addresses recorded for the stream in the log buffer; and the tail pointer identifies the end of the sequence of LBA addresses recorded for the stream in the log buffer. The host system can issue trims commands for the LBA addresses of a segment of the stream, ranging from the head pointer up till a sufficient amount of data of the stream has been erased from the beginning to free at least one superblock. The head pointer is then moved to a new beginning point of the sequence of LBA addresses in the log buffer. Once the head pointer moves to the top of the allocated log buffer, the head pointer can move to the bottom of the allocated log buffer for circular used of the log buffer.

Compared to sequential streams, non-sequential streams allow random writes and thus remove the tasks of sequentialization from the host system. The flash translation layer (FTL) of existing solid state drive can be used to implement sequentialization of writes to superblocks.

FIG. 1 illustrates an example computing system 100 that includes a memory sub-system 110 in accordance with some embodiments of the present disclosure. The memory sub-system 110 can include media, such as one or more volatile memory devices (e.g., memory device 131), one or more non-volatile memory devices (e.g., memory device 133), or a combination of such.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 123) and a software stack executed by the processor chipset. The processor chipset can include one or more cores, one or more caches, a memory controller (e.g., controller 121) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI) interface, a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 133) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 123 of the host system 120 can be, for example, a microprocessor, a central processing unit (CPU), a processing core of a processor, an execution unit, etc. In some instances, the controller 121 can be referred to as a memory controller, a memory management unit, and/or an initiator. In one example, the controller 121 controls the communications over a bus coupled between the host system 120 and the memory sub-system 110. In general, the controller 121 can send commands or requests to the memory sub-system 110 for desired access to memory devices 131, 133. The controller 121 can further include interface circuitry to communicate with the memory sub-system 110. The interface circuitry can convert responses received from the memory sub-system 110 into information for the host system 120.

The controller 121 of the host system 120 can communicate with the controller 111 of the memory sub-system 110 to perform operations such as reading data, writing data, or erasing data at the memory devices 131, 133 and other such operations. In some instances, the controller 121 is integrated within the same package of the processing device 123. In other instances, the controller 121 is separate from the package of the processing device 123. The controller 121 and/or the processing device 123 can include hardware such as one or more integrated circuits (ICs) and/or discrete components, a buffer memory, a cache memory, or a combination thereof. The controller 121 and/or the processing device 123 can be a microcontroller, special-purpose logic circuitry (e.g., a field programmable gate array (FPGA), an application specific integrated circuit (ASIC), etc.), or another suitable processor.

The memory devices 131, 133 can include any combination of the different types of non-volatile memory components and/or volatile memory components. The volatile memory devices (e.g., memory device 131) can be, but are not limited to, random-access memory (RAM), such as dynamic random-access memory (DRAM) and synchronous dynamic random-access memory (SDRAM).

Some examples of non-volatile memory components include a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 133 can include one or more arrays of memory cells. One type of memory cell, for example, single level cells (SLCs) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 133 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 133 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 133 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), Oxide based RRAM (OxRAM), negative-or (NOR) flash memory, and electrically erasable programmable read-only memory (EEPROM).

A memory sub-system controller 111 (or controller 111 for simplicity) can communicate with the memory devices 133 to perform operations such as reading data, writing data, or erasing data at the memory devices 133 and other such operations (e.g., in response to commands scheduled on a command bus by controller 121). The controller 111 can include hardware such as one or more integrated circuits (ICs) and/or discrete components, a buffer memory, or a combination thereof. The hardware can include digital circuitry with dedicated (i.e., hard-coded) logic to perform the operations described herein. The controller 111 can be a microcontroller, special-purpose logic circuitry (e.g., a field programmable gate array (FPGA), an application specific integrated circuit (ASIC), etc.), or another suitable processor.

The controller 111 can include a processing device 113 (processor) configured to execute instructions stored in a local memory 117. In the illustrated example, the local memory 117 of the controller 111 includes an embedded memory configured to store instructions for performing various processes, operations, logic flows, and routines that control operation of the memory sub-system 110, including handling communications between the memory sub-system 110 and the host system 120.

In some embodiments, the local memory 117 can include memory registers storing memory pointers, fetched data, etc. The local memory 117 can also include read-only memory (ROM) for storing micro-code. While the example memory sub-system 110 in FIG. 1 has been illustrated as including the controller 111, in another embodiment of the present disclosure, a memory sub-system 110 does not include a controller 111, and can instead rely upon external control (e.g., provided by an external host, or by a processor or controller separate from the memory sub-system).

In general, the controller 111 can receive commands or operations from the host system 120 and can convert the commands or operations into instructions or appropriate commands to achieve the desired access to the memory devices 133. The controller 111 can be responsible for other operations such as wear leveling operations, garbage collection operations, error detection and error-correcting code (ECC) operations, encryption operations, caching operations, and address translations between a logical address (e.g., logical block addressing (LBA) addresses, namespace) and a physical address (e.g., physical block address) that are associated with the memory devices 133. The controller 111 can further include host interface circuitry to communicate with the host system 120 via the physical host interface. The host interface circuitry can convert the commands received from the host system into command instructions to access the memory devices 133 as well as convert responses associated with the memory devices 133 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 111 and decode the address to access the memory devices 133.

In some embodiments, the memory devices 133 include local media controllers 135 that operate in conjunction with the memory sub-system controller 111 to execute operations on one or more memory cells of the memory devices 133. An external controller (e.g., memory sub-system controller 111) can externally manage the memory device 133 (e.g., perform media management operations on the memory device 133). In some embodiments, a memory device 133 is a managed memory device, which is a raw memory device combined with a local controller (e.g., local media controller 135) for media management within the same memory device package. An example of a managed memory device is a managed NAND (MNAND) device.

The computing system 100 includes a data placement manager 115 in the memory sub-system 110 that is configured to dynamically map writes of a stream to superblocks, communicate characteristics of the superblocks to the host system 120, and postpone reclaiming superblocks until the host system 120 has indicated that entire data in the superblocks can be erased. In some embodiments, the controller 111 in the memory sub-system 110 includes at least a portion of the data placement manager 115. In other embodiments, or in combination, the controller 121 and/or the processing device 123 in the host system 120 includes at least a portion of a storage access manager 125 that is configured to organize writes in streams, receive characteristics of superblocks in the memory sub-system 110 from the data placement manager 115, and send commands to the memory sub-system 110 to erase data according to the characteristics of superblocks. For example, the controller 111, the controller 121, and/or the processing device 123 can include logic circuitry implementing the data placement manager 115 and/or the storage access manager 125. For example, the controller 111, or the processing device 123 (processor) of the host system 120, can be configured to execute instructions stored in memory for performing the operations of the data placement manager 115 and/or and the storage access manager 125 described herein. In some embodiments, the data placement manager 115 is implemented in an integrated circuit chip disposed in the memory sub-system 110. In other embodiments, the storage access manager 125 is part of an operating system of the host system 120, a device driver, or an application.

Figure 2:
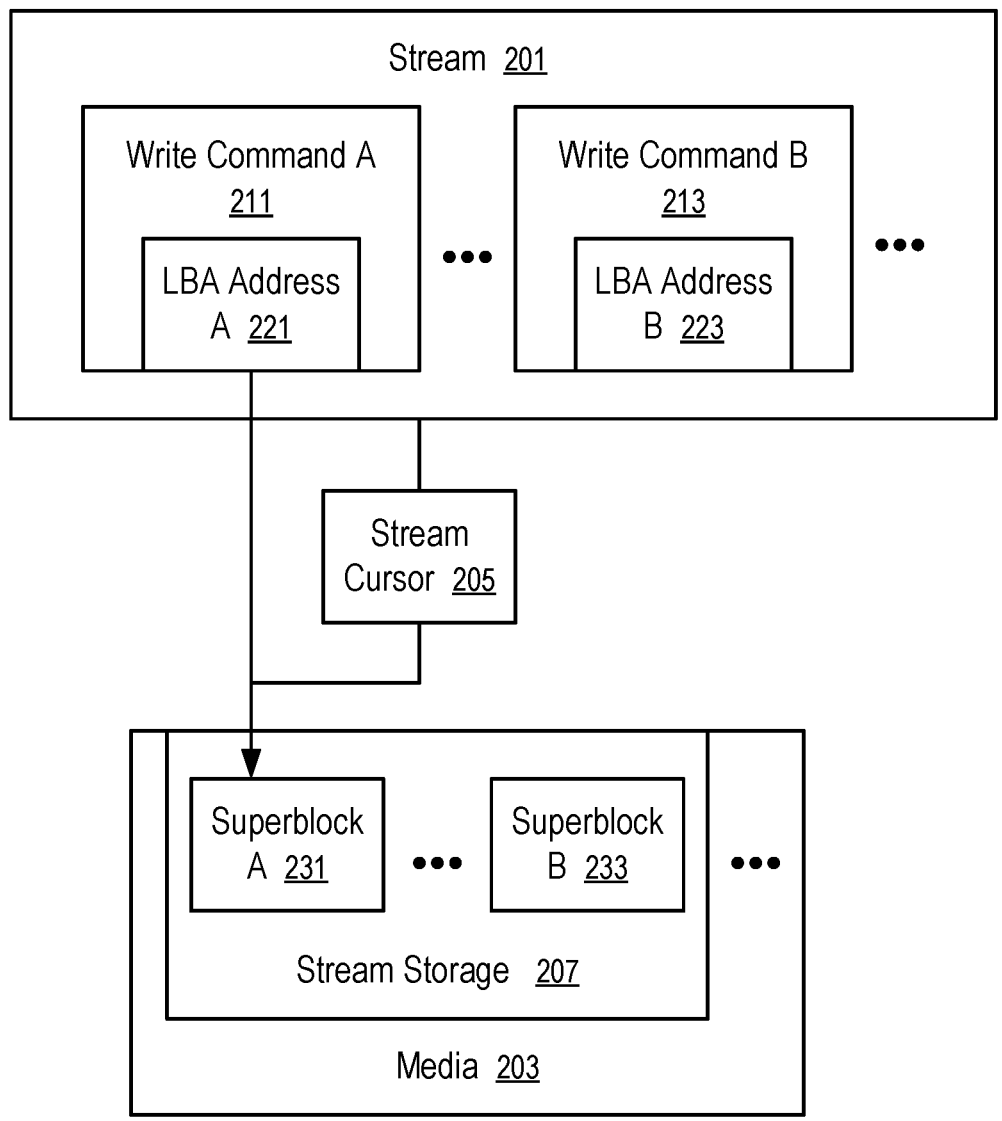
FIG. 2 shows an example of writing data via streaming to superblocks according to one embodiment.

FIG. 2 shows an example of writing data via streaming to superblocks according to one embodiment.

For example, the technique of streaming data to superblocks illustrated in FIG. 2 can be implemented in a computing system 100 of FIG. 1.

In FIG. 2, the host system 120 sends a stream 201 of write commands 211, . . . , 213 to the memory sub-system 110. Related data that are likely to be used together and/or erased together can be organized in the stream 201 by the host system 120. Multiple streams can be used concurrently for writing separate groups of data. Thus, the computing system 100 of FIG. 1 is not limited to use one stream at a time.

In FIG. 2, the data placement manager 115 in the memory sub-system 110 can use a stream cursor 205 to identify a superblock (e.g., 231, or 233) currently being used by the stream 201 to store data. It is not necessary for the data placement manager 115 to track all of the superblocks (e.g., 231, . . . , 233) used for the stream 201.

When the stream 201 provides a write command 211 to write data at an LBA address 221, the data placement manager 115 can determine whether the stream cursor 205 points to a superblock having a free storage space to save the data for the write command 211. Each superblock is used by one stream; and different streams do not share a superblock. If the current superblock identified by the cursor 205 of the stream is full, the data placement manager 115 can allocate another free superblock 231 to store the data of the write command 211. The data placement manager 115 can update a logical to physical address map to map the LBA address 221 to the physical address of a block in the superblock 231 in which the data of the write command 211 is stored.

In general, the media 203 of the memory sub-system 110 can have multiple integrated circuit dies. Each of the integrated circuit dies can have multiple planes of memory units (e.g., NAND memory cells). Each of the planes can have multiple blocks of memory units (e.g., NAND memory cells). Each of the blocks can have multiple pages of memory units (e.g., NAND memory cells). The memory units in each page is configured to be programmed to store/write/commit data together in an atomic operation; and the memory units in each block is configured to be erased data together in an atomic operation. A group of blocks can form a superblock (e.g., 231, . . . , 233).

Superblocks (e.g., 231, . . . , 233) in a memory sub-system 110 have a same size that is a multiple of the size of an LBA block. Superblocks in different memory sub-systems can have different sizes.

Preferably, the stream 201 organizes write commands 211 sequentially such that a subsequent write command in the stream 201 writes data at a next LBA address that is an increment from the LBA address of the current write command. After storing data of a multiple of write commands (e.g., 211, . . . , ) corresponding to the superblock size, the superblock 231 is full; and the data placement manager 115 can allocate another superblock (e.g., 233) for a next write command (e.g., 213).

As the stream 201 continues, the stream storage 207 allocated for the stream 201 can grow to include more superblocks (e.g., 231, . . . , 233). Thus, it is not necessary for the memory sub-system 110 and the host system 120 to determine a predetermined size of a zone. The memory sub-system 110 can be configured to handle stream rollover from one superblock to another superblock.

Superblocks in the media 203 can be allocated randomly for the stream storage 207 of the stream 201. It is not necessary to use superblocks of the media 203 sequentially.

Optionally, the stream 201 can write data at random addresses. For example, the sequence of write commands 211, . . . , 213 can have a random sequence of LBA address 221, . . . , 223. When the stream 201 writes at random address a subsequent write command in the stream 201 writes data at an unpredictable LBA address that is not increment from the LBA address of the current write command. The data placement manager 115 can map the random sequence of LBA addresses 221, . . . , 223 in the stream 201 into continuous physical addresses within the superblocks 231, . . . , 233. The superblocks 231, . . . , 233 do not have to be allocated sequentially for the stream storage 207.

After the data is written at an LBA address (e.g., 221, or 223) via the stream 201 and according to the stream cursor 205, the host system 120 can read at the LBA address (e.g., 221, or 223) with or without reference to the stream 201.

Writing data sequentially into superblocks 231, . . . , 233 can improve input/output performance of the memory sub-system 110.

When the host system 120 issues commands to delete data stored via the stream 201, the memory sub-system 110 can determine whether the data in a superblock (e.g., 231 or 233) has deleted in its entirety by the host system 120. If so, the data placement manager 115 can reclaim the superblock (e.g., 231 or 233) for new write commands in the stream 201 (or another stream); if not, the data placement manager 115 does not reclaim the superblock (e.g., 231 or 233); and the superblock partially erased by the host system 120 (e.g., 231 or 233) can be counted as being fully utilized in the memory sub-system 110. To have a superblock (e.g., 231 or 233) erased and reclaimed, the host system 120 can issue more commands to delete more data until an entire superblock (e.g., 231 or 233) is deleted and thus reclaimed as a free superblock.

Figure 3:
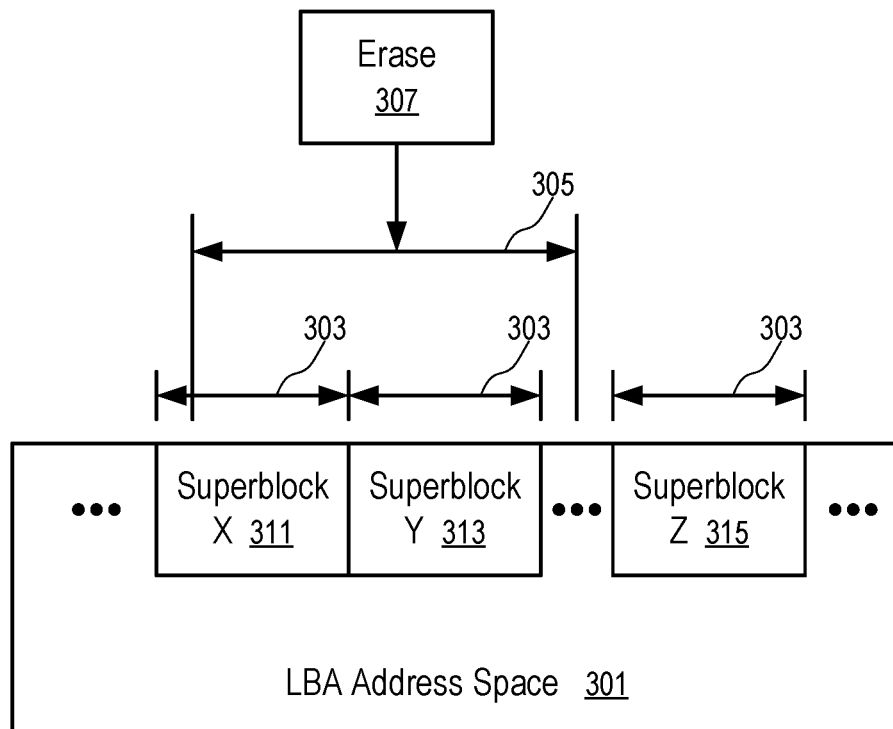
FIG. 3 shows an example erasing data from at least one superblock according to one embodiment.

FIG. 3 shows an example erasing data from at least one superblock according to one embodiment. For example, the technique of FIG. 3 can be used to delete data for reclaiming a portion of the stream storage 207 used to store data at sequential addresses in a stream 201 as in FIG. 2.

In FIG. 3, data is sequentially written via a stream 201. Thus, the superblocks 311, 313, . . . , 315 cover a contiguous portion of the LBA address space 301. Each of the superblock 311, 313, . . . , 315 has a size equal to a common superblock size 303. When the host system 120 issue commands to erase 307 data in a contiguous portion of the LBA address space 301 having a size 305 that is twice the superblock size 303, at least one superblock 313 is erased and can be reclaimed to store new data.

Optionally, the host system 120 tracks the initial LBA address 221 used in the beginning of a stream 201. Since the initial LBA address 221 causes the data placement manager 115 to allocate a superblock (e.g., 231), the initial LBA address 221 coincides with a boundary of the superblocks in the LBA address space 301. Thus, the host system 120 can determine the LBA addresses mapped to a superblock based on the continuous mapping of a segment of LBA address space 301 to superblocks 311, 313, . . . , 315 used for the stream 201.

The memory sub-system 110 can communicate the superblock size 303 to the host system 120 via a routine call (e.g., at the time of boot up). Alternatively, a user interface can be provided for an administrator to specify the superblock size 303. Optionally, the host system 120 can determine or estimate the superblock size 303 and/or a boundary LBA address of a superblock by deleting data from sequential LBA addresses until a superblock is reclaimed and the memory sub-system 110 reports a decrease in utilization of the media 203 of the memory sub-system 110.

Figure 4:
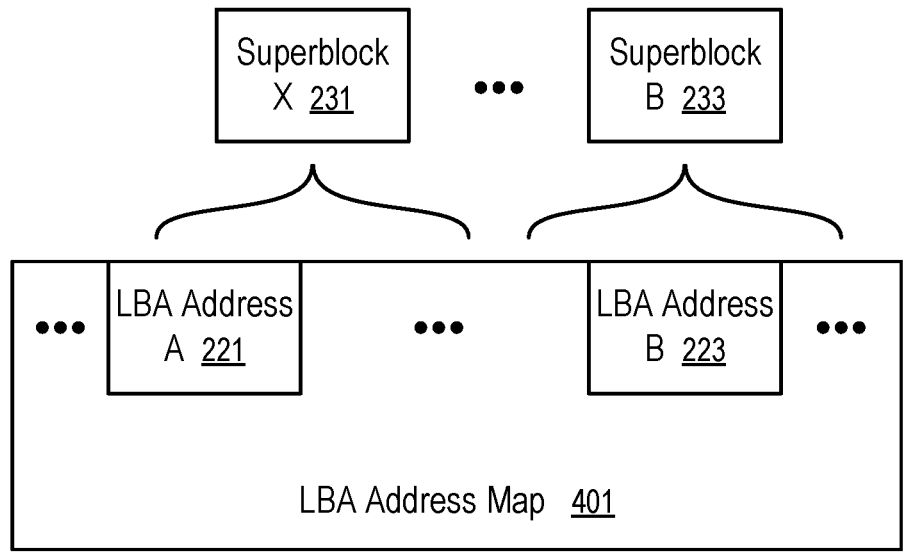
FIG. 4 illustrates an example of data mapping to facilitate erasure of a superblock according to one embodiment.

FIG. 4 illustrates an example of data mapping to facilitate erasure of a superblock according to one embodiment. For example, the technique of FIG. 4 can be used to delete data for reclaiming a portion of the stream storage 207 used to store data at random addresses in a stream 201 as in FIG. 2.

In FIG. 4, the host system 120 maintains an LBA address map 401 showing a sequence of LBA addresses 221, . . . , 223 as used in the corresponding sequence of write commands 21, . . . , 213 in a stream 201 to the memory sub-system 110. It is known that the data placement manager 115 starts to map the LBA address 221 provided at the beginning of the stream 201 to a superblock 231, and map the sequence of LBA addresses 221, . . . , 223 continuously to superblocks 231, . . . , 233. Thus, the host system 120 can determine which LBA addresses (e.g., 221, 223) are mapped to which superblocks (e.g., 231, 233). To delete the data stored from a superblock (e.g., 231 or 233), the host system 120 can use the LBA address map 401 to identify the LBA addresses (e.g., 221, . . . ; or 223, . . . ) that corresponds to the superblock and delete data from the identified LBA addresses to cause the data placement manager 115 to reclaim the superblock.

Figure 5:
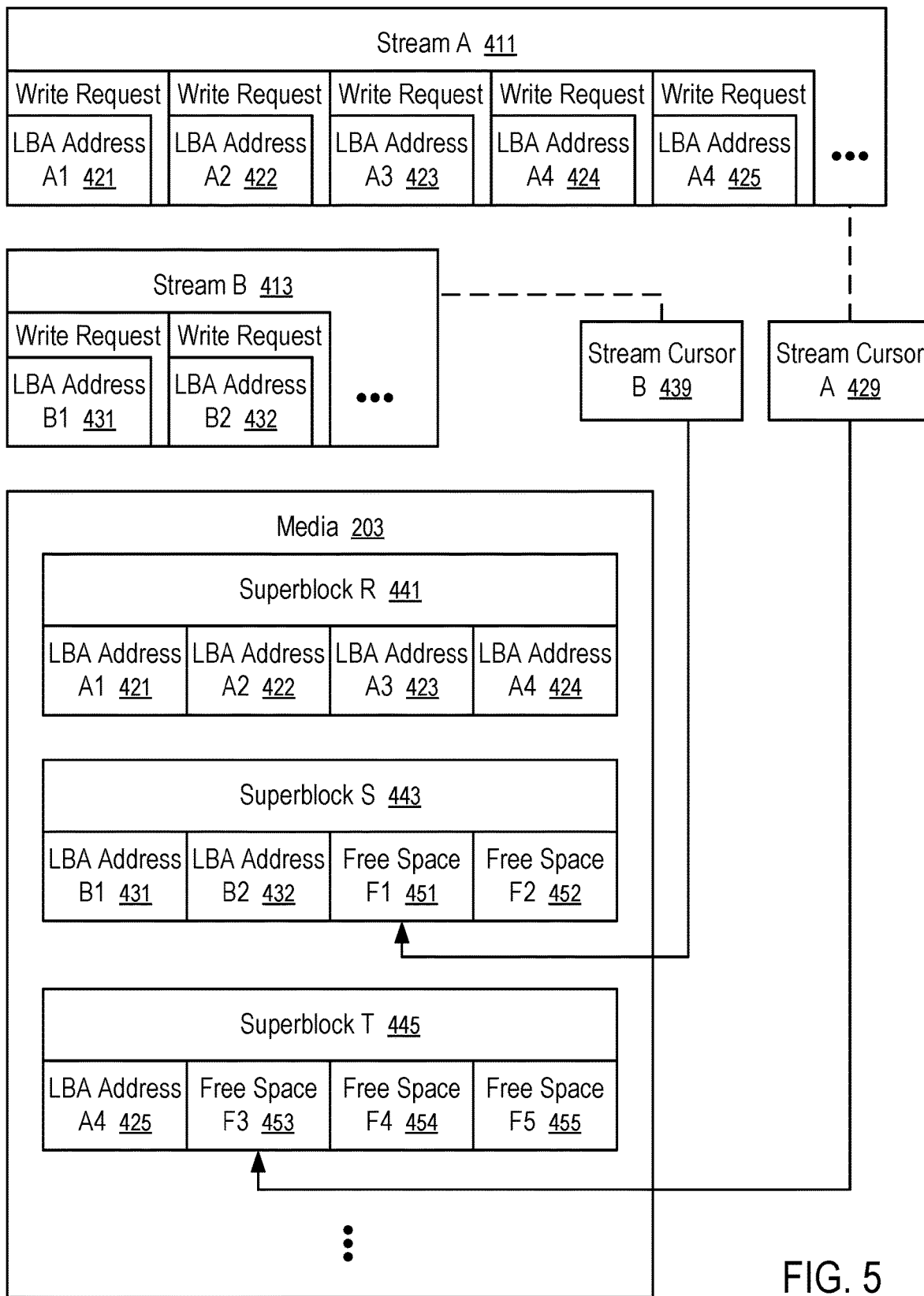
FIG. 5 shows an example of placing data of streams into superblocks according to one embodiment.

FIG. 5 shows an example of placing data of streams into superblocks according to one embodiment. The example of FIG. 5 can be implemented in the computing system 100 of FIG. 1 and in combination with the techniques of FIG. 2, FIG. 3, and/or FIG. 4.

In FIG. 5, the memory sub-system 110 maintains a stream cursor 429 for a stream 411 and another stream cursor 439 for another stream 413.

The stream 411 has a sequence of requests to write at LBA addresses 421, 422, 423, 424, and 425. For example, the LBA addresses 421 to 425 can appear random. For example, the subsequent LBA address 422 has no predetermined relation with the previous LBA address 421. In contrast, when the stream is sequentialized, a subsequent LBA address (e.g., 422) is an increment over the LBA address (e.g., 421) immediate before the subsequent LBA address (e.g., 422) in the stream 411.

When the write request containing the LBA address 421 in the stream 411 reaches the memory sub-system 110, the data placement manager 115 of the memory sub-system 110 allocates a free superblock 441 for the stream 411. The data placement manager 115 configures the stream cursor 429 to point to a physical block of free space available in the superblock 441 to store the data of the request writing at the LBA address 421.

FIG. 5 illustrates an example of a superblock size 303 that is four times the size of an LBA block. In general, the superblock size 303 is not necessarily four times the size of an LBA block; and the technique illustrated via the example of FIG. 5 can be used for any ratio between the superblock size 303 and the size of an LBA block.

In FIG. 5, the data of the write requests at the LBA addresses 421, 422, 423 and 424 in the stream 411 are stored sequentially into the superblock 441. A flash translation layer (FTL) of the memory sub-system 110 maps the LBA addresses 421, 422, 423, and 424, which can be non-sequential, to the corresponding sequential physical addresses of blocks of memory cells in the superblock 441.

In some instances, a later request can write at a same LBA address as an earlier request. For example, the LBA address 423 can be the same as LBA address 421; thus the data previously stored according to the LBA address 421 at a different physical address can be considered erased; and the flash translation layer (FTL) of the memory sub-system 110 can map the LBA address to the new physical address and indicate that the block previously written according to the LBA address 421 is no longer in use.

Subsequently, when a request to write at LBA address 425 arrives at the memory sub-system 110, the data placement manager 115 of the memory sub-system 110 determines that the superblock 441 is full and allocates another free superblock 445 for the stream 411. After storing the data at a physical block in the superblock 445 mapped to the LBA address 425, the stream cursor 429 points to the next physical block of free space 453 in the superblock 445 for storing data of a next write request in the stream 411. The superblock 445 has additional free spaces 454 and 455 usable for further write requests at LBA addresses.

Thus, through the address mapping performed by the flash translation layer (FTL) of the memory sub-system 110, the memory sub-system 110 can write the data of the sequence of write requests in the stream 411 as sequential writes within each superblocks (e.g., 441, 445), but the use of superblocks can be non-sequential or random.

When a request to write data at the LBA address 431 in the stream 413 arrives at the memory sub-system 110, the data placement manager 115 allocates a free superblock 443 that is not being used by another stream. After storing the data of the requests to write at the LBA address 431 and LBA address 432, the stream cursor 439 of the stream 413 is updated to point to the next block of physical free space 451 in the superblock 443 for storing data of a next write request in the stream 413; and the superblock 443 has an additional free space 452 usable for storing data of the write request following the next write request in the stream 413.

In some instances, a later request in one stream can write at a same LBA address as an earlier request in another stream. For example, the LBA address 423 in stream 411 can be same as LBA address 431 in stream 413. When the request to write at the LBA address 423 in the stream 411 is sent to the memory sub-system 110 after the request to write at the LBA address 431 in the stream 413, the data previously stored according to the LBA address 431 in the stream is marked as no longer in use in the superblock 443; and the flash translation layer (FTL) of the memory sub-system 110 can map the LBA address to the new location in the superblock 441 and indicate that the block written according to the LBA address 431 in the superblock 413 is no longer in use.

When the host system 120 has indicated that the data in an entire superblock 441 is no longer in use, the memory sub-system 110 can reclaim the superblock 441 as a free superblock.

For example, some of the physical blocks in the superblock 441 used to store data for LBA address 421 to 424 in stream 411 can be considered erased based on a subsequent request to write at a same LBA address; and some of the physical blocks in the superblock 441 used to store data for LBA address 421 to 424 in stream 411 can be erased explicitly via commands from the host system 120. There may be excessive, unnecessarily commands from the host system 120 to erase data. However, when the blocks used to store data for LBA address 421 to 424 in stream 411 are freed, the memory sub-system 110 can reclaim the superblock 441. However, when there is at least one block in the superblock 441 contains data in use for the stream 411, the superblock 441 is not reclaimed to avoid write amplification.

In some instances, a superblock (e.g., 445) can have a bad block (e.g., corresponding to free space 453). The memory sub-system 110 can skip the bad block and use the next free space (e.g., 454) for storing the data of a write request following the request having the LBA address 425 in the stream 411. As a result, the accurate mapping of LBA addresses to superblock 441 may not be apparent to the host system 120.

To facilitate the erasure of data from entire superblocks to reclaim their storage spaces, the host system 120 can log the sequences of LBA addresses used in the streams (e.g., 411, 413) and issue commands to erase data according to the logged LBA address sequences.

Figure 6:
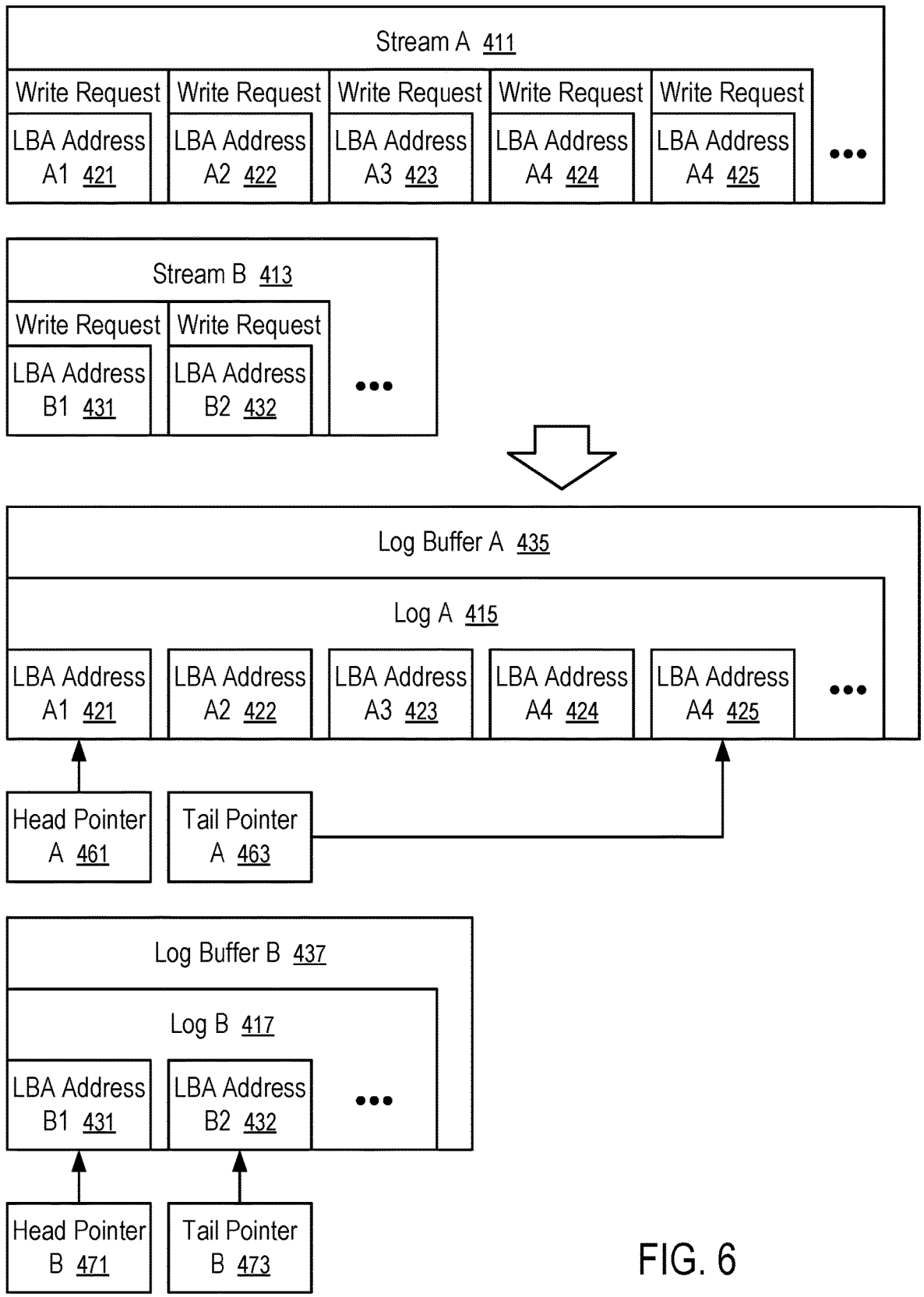
FIG. 6 and FIG. 7 show examples of logging sequences of logical addresses used in streams illustrated in FIG. 5.
Figure 7:
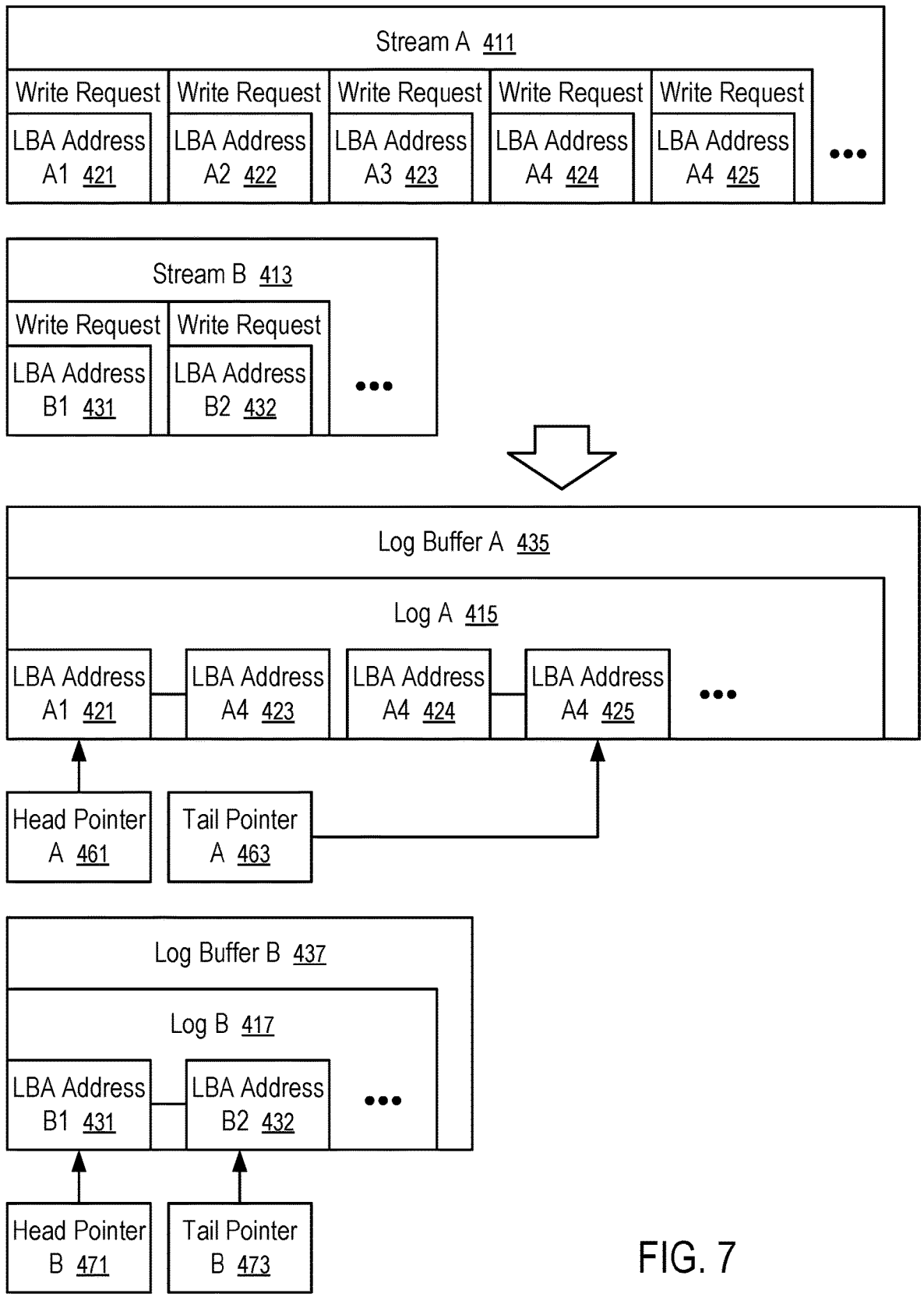

FIG. 6 and FIG. 7 show examples of logging sequences of logical addresses used in streams illustrated in FIG. 5.

In FIG. 6, the host system 120 allocates a log buffer 435 to store the log 415 of an LBA address sequence for a stream 411, and another log buffer 437 to store the log 417 of the LBA address sequence for another stream 411.

For example, the host system 120 maintains a head pointer 461 and a tail pointer 463 for the log 415 stored in the log buffer 435. The header pointer 461 identifies the location in the log buffer 435 storing the starting LBA address 421 of the segment of the stream 411 retained in the media 203 of the memory sub-system 110; and the tail pointer 463 identifies the location the log buffer 435 storing the last LBA address 425 of the stream 411 as currently being stored in the media 203.

As more write request are sent in the stream 411 to the memory sub-system 110, the host system 120 can add more LBA addresses in the order in which data is written via the stream 411.

When the log buffer 435 allocated to store the log 415 is full, the host system 120 can issue commands to the memory sub-system 110 to erase data from LBA addresses starting from the sequence of LBA addresses identified by the head pointer 461.

For example, after erasing the data at LBA address 421, the head pointer 461 moves to identify the next LBA address 422 in the log 415 as the beginning of the remaining segment of the stream 411 retained in the memory sub-system 110.

For example, after erasing the data from LBA addresses 421, 422, 423, and 424, the superblock 441 as used to store the data of LBA addresses 421, 422, 423, and 424 illustrated in FIG. 5 are entirely erased and thus can be reclaimed as a free superblock.

In general, the host system 120 may not know exactly the mapping of LBA addresses to superblocks. Thus, to ensure at least one superblock is erased, the host system 120 can erase twice the amount of data that can be stored in a superblock, as illustrated in FIG. 3, to cause at least one superblock 313 is freed. Subsequently, the host system 120 can continue erasing the amount of data that can be stored in a superblock to free an additional superblock.

In some instances, the host system 120 can track the initial LBA address 421 that is written via the initial write request of the stream 411 to cause the memory sub-system 110 to allocate a free superblock 441 for storing the stream 411. Thus, the host system 120 can erase the amount of data that can be stored in a superblock to free an additional superblock. Subsequently, the LBA address (e.g., 425) identified by the head pointer 461 may or may not aligned with the boundary of a superblock (e.g., 445). For example, when the superblock 441 has a bad block and thus has less storage capacity than what is specified by the superblock size 303, erasing the amount of data according to the superblock size 303 can cause the partial erasure of the superblock 445. The host system 120 can continue erasing an amount of data that can be stored in a superblock according to the superblock size 303 to at least ease the superblock 445.

After erasing data according to the head pointer 461, the beginning portion of the log buffer 435 allocated for the log 415 is freed; and the tail pointer 463 can start from the beginning of the log buffer 435 to store further LBA addresses used in the stream 411. Similarly, when the head pointer 461 reaches the end of the log buffer 435, the head pointer 461 can go back to the beginning of the log buffer 435. Thus, the log buffer 435 can be used in a circular way.

Optionally, in the process erasing data from LBA addresses according to a log (e.g., 415 or 417), the host system 120 to query the rate of storage space utilization to detect the change of the storage space utilization rate of the memory sub-system 110, as a result the memory sub-system 110 reclaiming a superblock. Based on the changes, the host system 120 can determine and/or estimate the alignment of the boundaries of superblocks with LBA addresses in the sequence recorded in the log 415.

Similarly, the host system 120 can allocate a log buffer 437 for the log 417 of LBA addresses (e.g., 431, 432) in the separate stream 413 and maintain a head pointer 471 and the tail pointer 473 identifying the storage location of the latest segment of the sequence of LBA addresses (e.g., 431, 432) in the stream 413.

In some instances, the stream 411 writes data at random LBA addresses; and the stream 413 writes data at sequential LBA addresses. In some instances, the stream 413 write data initially at a sequential LBA addresses and then at random LBA addresses. In some instances, the stream 411 can write at random LBA addresses in a period time and when write at sequential LBA addresses in a subsequent period of time. Thus, the host system 120 is not limited to use the stream (e.g., 411) in a particular predefined pattern (e.g., random or sequential).

Optionally, the host system 120 can join adjacent sequences of sequential LBA addresses as illustrated in FIG. 7.

In FIG. 7, the LBA addresses 421, 422, and 423 are sequential. Thus, the memory sub-system 110 records the range of the LBA addresses being starting from LBA address 421 and ending at LBA address 423. Alternatively, the memory sub-system 110 can record the range via the starting LBA address 421 and the number of sequential LBA addresses in the range.

When the LBA address 424 is not sequential following the LBA address 423, the host system 120 records a new range starting from LBA address 424 and ending at LBA address 424. Subsequently, when the LBA address 425 is found to be sequential to the LBA address 424, the range can be updated to end at the LBA address 425.

For example, when the stream 413 is sequential, the log 417 can record an LBA address range; and the range can grow with the stream 413 without using additional storage space in the log buffer 437 allocated for the log 417. When the stream 413 becomes non-sequential, the next LBA address range used in the stream 413 can be added to the log 417.

Figure 8:
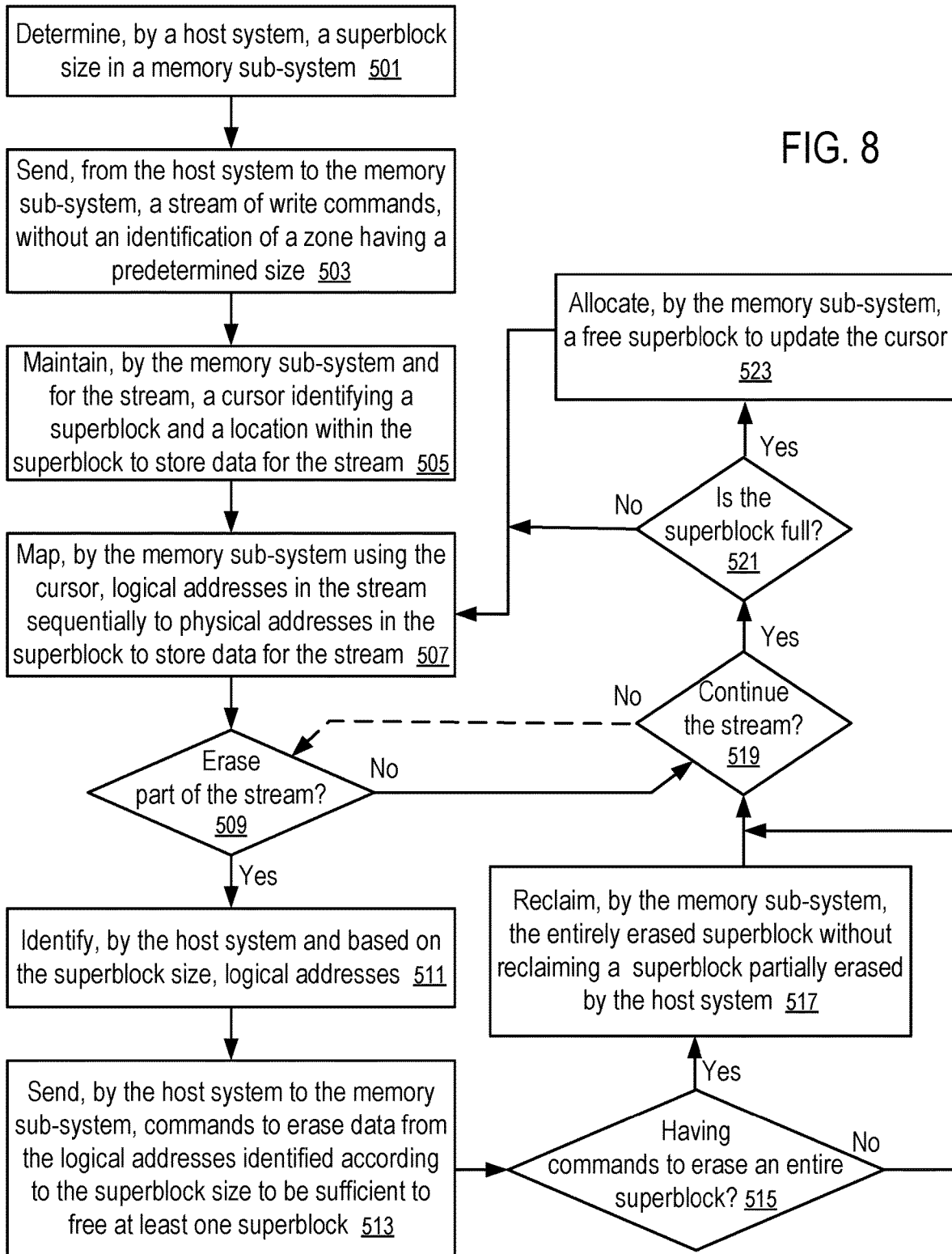
FIG. 8 shows a method of accessing a storage according to one embodiment.

FIG. 8 shows a method of accessing a storage according to one embodiment. The method of FIG. 8 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 8 is performed at least in part by the data placement manager 115 and/or the storage access manager 125 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the operations in the method of FIG. 8 can be performed by a storage access manager 125 in the host system 120 of FIG. 1 and a data placement manager 115 in the memory sub-system 110 of FIG. 1. The storage access manager 125 can be implemented via instructions executed by the processing device 123. For example, the instructions of the storage access manager 125 can be configured as part of an operating system, a device driver for the memory sub-system 110, an application, a routine, etc. The data placement manager 115 can be implemented via instructions executed by the processing device 113 and/or logic circuits. The instructions of the data placement manager 115 can be configured as part of the firmware of the memory sub-system 110. The memory sub-system 110 can be implemented as a solid-state drive in some implementations.

At block 501, a host system 120 determines a superblock size 303 in a memory sub-system 110. The superblock size 303 can be determined once (e.g., at boot time) for the memory sub-system 110.

For example, the memory sub-system 110 has memory devices 131, . . . , 133 that are integrated circuit memory devices each having memory cells formed on one or more integrated circuit dies. The memory cells are configured as a plurality of superblocks having a same superblock size 303.

For example, during a time of booting up the host system 120, the host system can request the memory sub-system 110 to provide data indicative of the superblock size 303. Alternatively, an administrator of the host system 120 can use a user interface to specify a configuration parameter indicative of the superblock size 303.

At block 503, the host system 120 sends to the memory sub-system 110, a stream 201 of write commands 211, . . . , 213, without an identification of a zone having a predetermined size.

For example, the memory sub-system 110 can have a host interface to communicate with the host system 120 (e.g., through a computer bus). The host system 120 can organize related writes into streams and send to the host interface of the memory sub-system 110 write commands as part of the stream 201.

Optionally, the host system 120 can serialize the write commands 211, . . . , 213 in the stream 201 according to logical addresses (e.g., LBA addresses 221, . . . , 223) of the write commands 211, . . . , 213. Thus, the write commands 211, . . . , 213 writes to logical addresses sequentially. Two successive write commands in the stream 201 write to two adjacent logical addresses without skipping an intermediate address between the two logical addresses in the logical address space 301. When the write commands 211, . . . , 213 in the stream are sequentialized, the management of address mapping can be simplified.

In some instances, the host system 120 can write at random logical addresses via the sequence of write commands 211, . . . , 213 in the stream 201. The logical address of a subsequent write command is not predicable from the logical address of a current write command. To facilitate efficient reclaim of storage spaces used for a prior recorded portion of the stream, the host system 120 can track the sequence of logical address of the write commands 211, . . . , 213 in the stream 201 to identify a set of logical addresses that covers at least a superblock, as illustrated in FIG. 4. In some implementations, the host system 120 can determine a logical address corresponding to a boundary of a superblock and thus identify the entire set of logical addresses mapped to the superblock. When the host system 120 does not track and/or have information on logical addresses corresponding to boundaries of superblocks, the host system 120 can issue commands to erase more than twice the superblock size 303 as in FIG. 3.

At block 505, the memory sub-system 110 maintains, for the stream 201, a cursor 205 identifying a superblock 231 and a location within the superblock 231 to store data for the stream 201.

Different streams have different cursors and thus don't share a superblock. An entirely free superblock 231 is allocated for the cursor 205 of the stream 201 whether the stream 201 needs storage space to write the data of a command 211 in the stream 201. Subsequently, the superblock 231 is used to provide storage space for subsequent write commands until the superblock 231 is full.

At block 507, the memory sub-system 110 maps, using the cursor 205, logical addresses 221 in the stream 201 sequentially to physical addresses in the superblock 231 to store data for the stream.

In general, the memory sub-system 110 can map the logical address 221 to the physical addresses in the superblock 231 according to a predetermined pattern (e.g., sequentially or another order) such that a contiguous segment of write commands (e.g., 211, . . . ) in the stream 201 has logical addresses of the write commands (e.g., 211, . . . ) being mapped to physical addresses within the superblock 231. The pattern can be a sequential pattern, or a pattern determined by an algorithm or a look up table.

At block 509, the host system 120 determines whether to erase part of the stream 201 previously stored into the memory sub-system 110.

If the host system 120 determines not to erase at block 509, the host system 120 and/or the memory sub-system 110 can determine, at block 519, whether there is a further write command continuing the stream 201. If so, the memory sub-system 110 can determine, at block 521 whether the superblock 231 identified by the stream cursor 205 is full. If full, the memory sub-system 110 allocates, at block 523, a free superblock (e.g., 233) to update the cursor 205. At block 507, the memory sub-system 110 can continue mapping logical addresses of further write commands to the superblock identified by the stream cursor 205, until at block 521, the memory sub-system 110 can determine that the current superblock 231 identified by the stream cursor 205 is full; and then at block 523, the memory sub-system 110 allocates a free superblock for the stream cursor 205.

If, at block 509, the host system 120 decides to erase part of the stream 201 having been recorded into the memory sub-system 110, the host system identifies, at block 511 and based on the superblock size, logical addresses from which data is to be erase.

At block 513, the host system 120 sends, to the memory sub-system 110, commands to erase data from the logical addresses identified according to the superblock size 303 to be sufficient to free at least one superblock 313.

For example, the host system 120 can identify the logical addresses for erasure such that the data at the logical addresses has a size 305 that is at least twice of the superblock size 303.

When the memory sub-system 110 receives commands to erase data from the host system 120, the memory sub-system 110 can determine, at block 515, whether sufficient commands have been received from the host system 120 to erase an entire superblock (e.g., 313). If so, at block 517, the memory sub-system 110 reclaims the entirely erased superblock (e.g., 313) as a free superblock without reclaiming a superblock partially erased by the host system 120. Since no data is moved from a partially erased superblock for reclaiming, write amplification can be reduced. If insufficient LBA logical addresses have been erased to free an entire superblock, the host system 120 can send more commands as in block 513 to erase an entire superblock.

Figure 9:
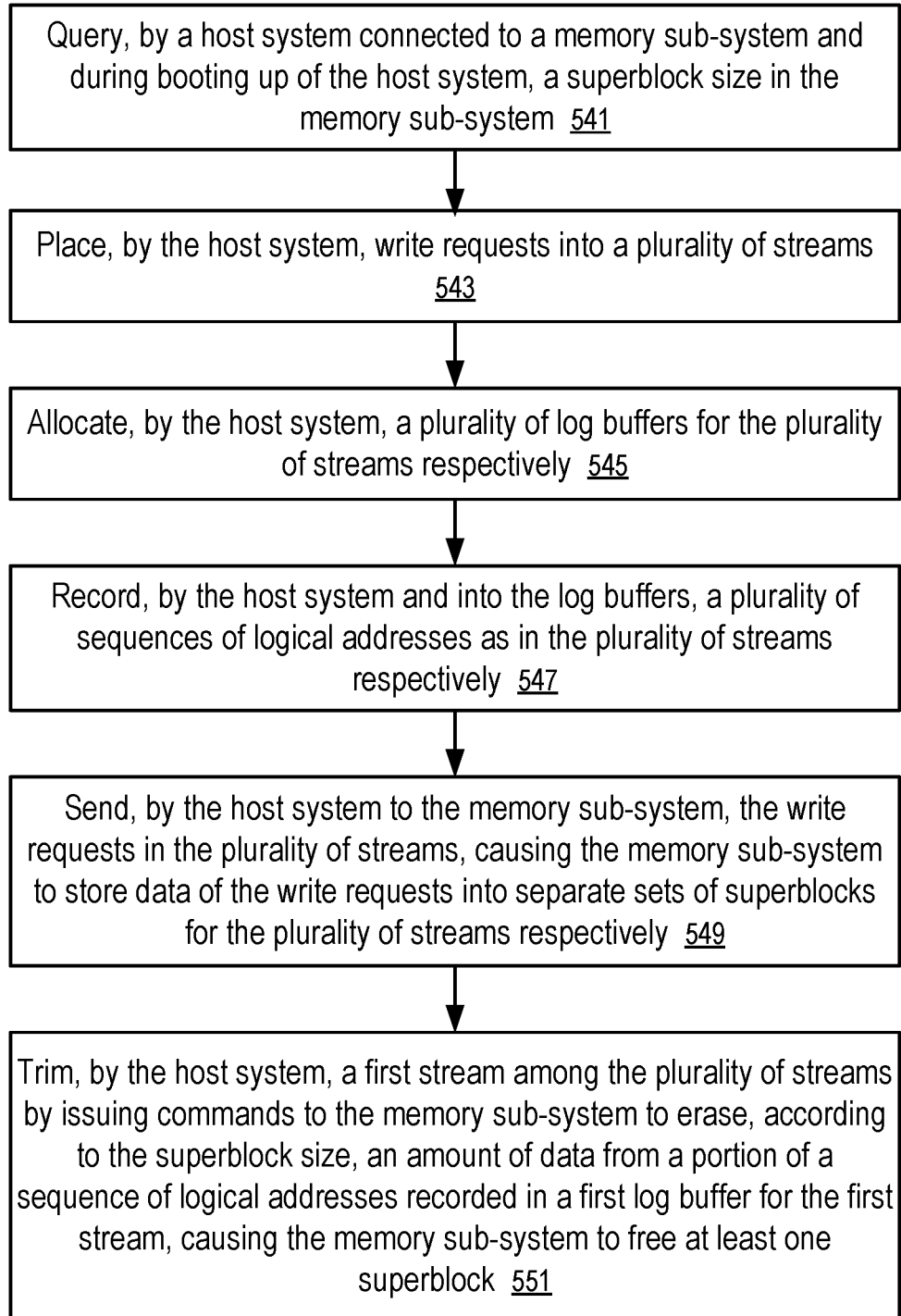
FIG. 9 shows a method of tracking logical addresses used in streams to erase data from superblocks according to one embodiment.

FIG. 9 shows a method of tracking logical addresses used in streams to erase data from superblocks according to one embodiment. The method of FIG. 9 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 9 is performed at least in part by the data placement manager 115 and/or the storage access manager 125 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 541, a host system 120 connected to a memory sub-system 110 queries, during booting up of the host system 120, a superblock size 303 in the memory sub-system 110. For example, the method of FIG. 9 can be used in combination with the method of FIG. 8.

At block 543, the host system 120 places write requests into a plurality of streams (e.g., 411, 413).

At block 545, the host system 120 allocates a plurality of log buffers (e.g., 435, 437) for the plurality of streams (e.g., 411, 413) respectively.

At block 547, the host system 120 records, into the log buffers (e.g., 435, 437), a plurality of sequences of logical addresses (e.g., 421, ..., 425; 431, 432, ...) as in the plurality of streams (e.g., 411, 413) respectively.

At block 549, the host system 120 sends, to the memory sub-system 110, the write requests in the plurality of streams (e.g., 411, 413), causing the memory sub-system 110 to store data of the write requests into separate sets of superblocks (e.g., 441, 445; 443) for the plurality of streams (e.g., 411, 413) respectively.

At block 551, the host system 120 trims a first stream (e.g., 411 or 413) among the plurality of streams (e.g., 411, 413) by issuing commands to the memory sub-system 110 to erase, according to the superblock size 303, an amount 305 of data from a portion of a sequence of logical addresses (e.g., 421 to 425; 431 to 432) recorded in a first log buffer (e.g., 435 or 437) for the first stream (e.g., 411 or 413), causing the memory sub-system 110 to free at least one superblock (e.g., 313, 441 or 443).

For example, the host system 120 can erase the amount 305 of data that is at least twice an amount of the superblock size 303 to cause at least one superblock to be erased entirely.

For example, the host system 120 can maintain, for the first stream (e.g., 411), a head pointer (e.g., 461) and a tail pointer (e.g., 463). The head pointer (e.g., 461) identifies a location in the first log buffer (e.g., 435) storing a first logical address 421 used in a beginning of a segment of the first stream (e.g., 411) stored in the memory sub-system 110. The tail pointer (e.g., 463) identifies a location in the first log buffer (e.g., 435) storing a second logical address (e.g., 425) used in an end of the first stream (e.g., 411). The data of write requests in the segment is currently stored and available in a set of superblocks (e.g., 441, 445) of the memory sub-system 110. When the first stream (e.g., 411) has write requests before the segment, the host system 120 has issued commands to the memory sub-system 110 to erase the data of write requests in trimming the first stream (e.g., 411). Thus, the data written before the segment of the first stream (e.g., 411) is considered not available to host system 120 anymore.

For example, to trim the first stream 411, the host system 120 identifies a portion of the sequence of logical addresses (e.g., 421, ...) based on the head pointer 461. The portion identified for trimming or erasing starts from the first logical address 421 stored in the first log buffer 435 at the location identified by the head pointer 461. The portion includes a count of logical addresses in the sequence including and following the first logical address 421. A storage capacity corresponding to the count of logical addresses can be no less than a storage capacity of the superblock size 303, such as twice the storage capacity of the superblock size 303 or more. By trimming or erasing the portion, at least one superblock used to store data for the first stream 411 is erased in entirety and thus can be reclaimed by the memory sub-system 110 without further garbage collection operations (e.g., moving/copying remaining not-yet-erased data from a superblock in order to free the superblock).

After trimming or erasing data at the portion of logical addresses (e.g., 421, 422, 423, 424), the host system 120 updates the head pointer 461 to identify a location in the first log buffer 435 storing a third logical address (e.g., 425) that follows the portion in the first stream 411.

For example, the first log buffer 435 has a predetermined size. When the first log buffer is full, the host system 120 can trim the portion from the remaining segment starting from the position identified by the head pointer 461. Thus, the head pointer 461 can move to between the beginning and the end of the first log buffer 435.

After updating the head pointer 461 to free up a portion of the first log buffer 435 before the current location identified by the head pointer 461, the host system 120 can move the tail pointer 463 to identify a beginning of the first log buffer 435 to use the first log buffer 435 in a circular way. When trimming the stream 411, the head pointer 461 does not move pass the tail pointer 463. When extending the 411 stream, the tail pointer 463 does not move over the head pointer 461.

In some implementations, the sequence of logical addresses (e.g., 421, ...) used in the stream 411 is recorded in the first log buffer 435 as one or more ordered ranges of logical addresses, as illustrated in FIG. 7. Optionally, the host system 120 can join adjacent logical address ranges. For example, when one or more write requests added to the stream 411 has a range of sequential logical addresses, the host system 120 can determine whether the range continues the last range of logical addresses stored at the location identified by the tail pointer 463; and if so, the host system 120 can update the range at the tail pointer 463 to include the range of sequential logical addresses of the added write requests.

The content of the log buffers (e.g., 435, 437) can be stored in a non-volatile memory to support stream trimming after power off and/or power interruption. For example, the host system 120 can stream the content of one or more large log buffers to a namespace in the memory sub-system 110.

Figure 10:
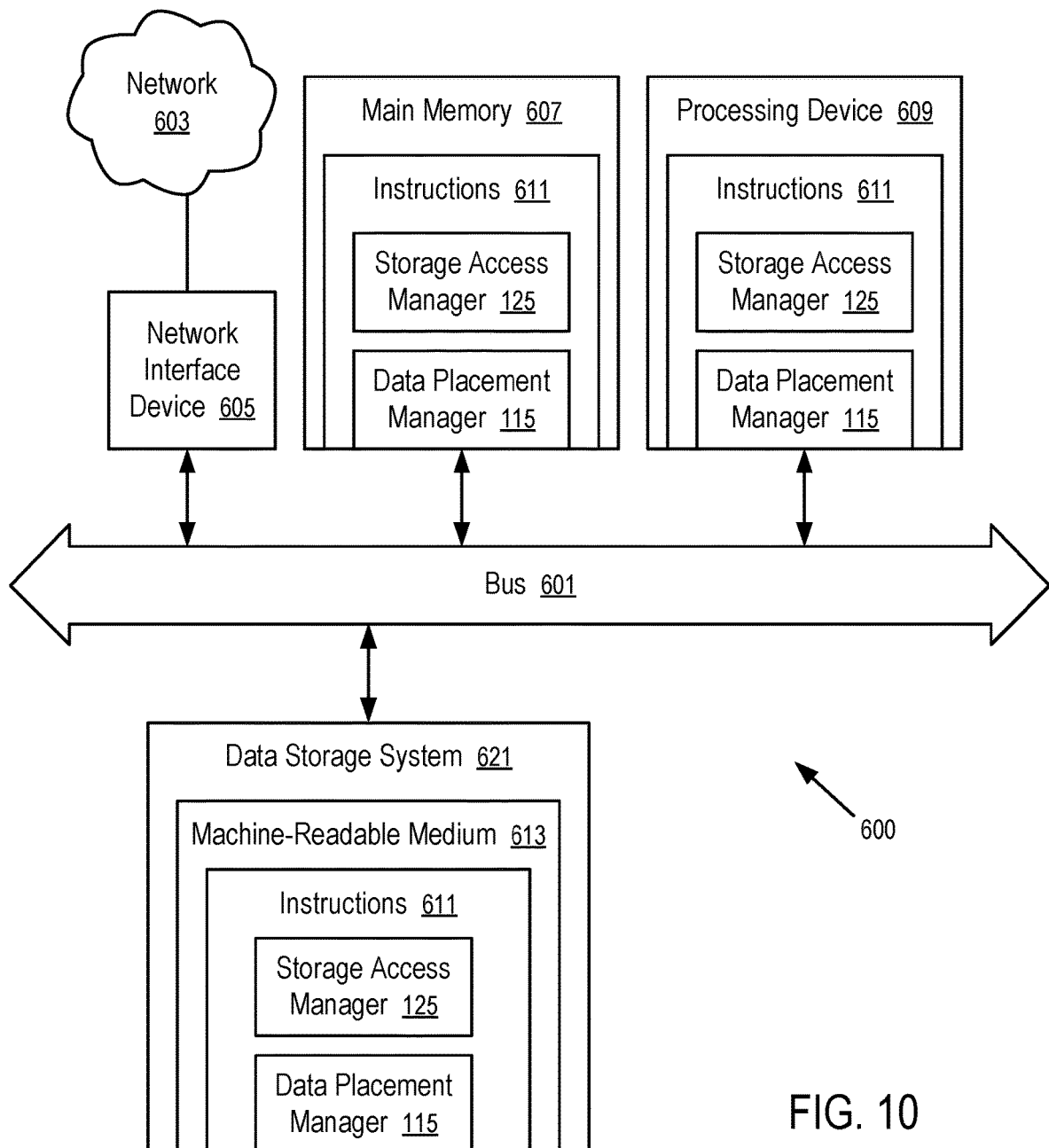
FIG. 10 is a block diagram of an example computer system in which embodiments of the present disclosure can operate.

FIG. 10 is a block diagram of an example computer system in which embodiments of the present disclosure can operate.

FIG. 10 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a data placement manager 115 and/or a storage access manager 125 (e.g., to execute instructions to perform operations corresponding to the data placement manager 115 and/or the storage access manager 125 described with reference to FIGS. 1-5). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 609, a main memory 607 (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system 621, which communicate with each other via a bus 601 (which can include multiple buses).

Processing device 609 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 609 can also be one or more special-purpose processing devices such as an application specific integrated circuit (ASIC), a field programmable gate array (FPGA), a digital signal processor (DSP), network processor, or the like. The processing device 609 is configured to execute instructions 611 for performing the operations and steps discussed herein. The computer system 600 can further include a network interface device 605 to communicate over the network 603.

The data storage system 621 can include a machine-readable medium 613 (also known as a computer-readable medium) on which is stored one or more sets of instructions 611 or software embodying any one or more of the methodologies or functions described herein. The instructions 611 can also reside, completely or at least partially, within the main memory 607 and/or within the processing device 609 during execution thereof by the computer system 600, the main memory 607 and the processing device 609 also constituting machine-readable storage media. The machine-readable medium 613, data storage system 621, and/or main memory 607 can correspond to the memory sub-system 110 of FIG. 1.

In one embodiment, the instructions 611 include instructions to implement functionality corresponding to a data placement manager 115 and/or a storage access manager 125 (e.g., the data placement manager 115 and/or the storage access manager 125 described with reference to FIGS. 1-5). While the machine-readable medium 613 is shown in an example embodiment to be a single medium, the term "machine-readable medium" should be taken to include a single medium or multiple media that store the one or more sets of instructions. The term "machine-readable medium" shall also be taken to include any medium that is capable of storing or encoding a set of instructions for execution by the machine and that cause the machine to perform any one or more of the methodologies of the present disclosure. The term "machine-readable medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory devices, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   querying, by a host system connected to a memory sub-system and during booting up of the host system, a superblock size in the memory sub-system;
   placing, by the host system, write requests into a plurality of streams;
   allocating, by the host system, a plurality of log buffers for the plurality of streams respectively;
   recording, by the host system and into the log buffers, a plurality of sequences of logical addresses as in the plurality of streams respectively;
   sending, by the host system to the memory sub-system, the write requests in the plurality of streams, causing the memory sub-system to store data of the write requests into separate sets of superblocks for the plurality of streams respectively; and
   trimming, by the host system, a first stream among the plurality of streams by issuing commands to the memory sub-system to erase, according to the superblock size, an amount of data from a portion of a sequence of logical addresses recorded in a first log buffer for the first stream, causing the memory sub-system to free at least one superblock.

2. The method of claim 1, wherein the amount is at least twice an amount of the superblock size.

3. The method of claim 1, further comprising:
   maintaining, by the host system, a head pointer identifying a location in the first log buffer storing a first logical address used in a beginning of a segment of the first stream stored in the memory sub-system and a tail pointer identifying a location in the first log buffer storing a second logical address used in an end of the first stream.

4. The method of claim 3, wherein the portion of the sequence is identified, based on the head pointer, to start from the first logical address and having a count of logical addresses, in the sequence, storing no less than a storage capacity of the superblock size.

5. The method of claim 4, further comprising:
   updating the head pointer to identify a location in the first log buffer storing a third logical address that follows the portion in the first stream.

6. The method of claim 5, wherein the first log buffer has a predetermined size; and the trimming is in response to the first log buffer being full.

7. The method of claim 6, wherein after updating the head point to free up a portion of the first log buffer before the head pointer, the method further comprises:
   moving the tail pointer to a beginning of the first log buffer to use the first log buffer in a circular way.

8. The method of claim 3, wherein the sequence is recorded in the first log buffer as one or more ordered ranges of logical addresses.

9. The method of claim 8, further comprising:
   updating a range of logical addresses identified by the tail pointer to include one or more logical addresses in response to a request to write at the one or more logical addresses being added to the first stream and the one or more logical addresses being sequential to the range of logical addresses identified by the tail pointer.

10. A computing system, comprising:
    a host system connected to a memory sub-system, the host system comprising a processing device configured via instructions to:
    query, during booting up of the host system, a superblock size in the memory sub-system;
    place write requests into a plurality of streams;
    allocate a plurality of log buffers for the plurality of streams respectively;
    record, into the log buffers, a plurality of sequences of logical addresses as in the plurality of streams respectively;
    send, to the memory sub-system, the write requests in the plurality of streams, causing the memory sub-system to store data of the write requests into separate sets of superblocks for the plurality of streams respectively; and trim a first stream among the plurality of streams by issuing commands to the memory sub-system to erase, according to the superblock size, an amount of data from a portion of a sequence of logical addresses recorded in a first log buffer for the first stream, causing the memory sub-system to free at least one superblock.

11. The computing system of claim 10, further comprising:

maintaining, by the host system, a head pointer identifying a location in the first log buffer storing a first logical address used in a beginning of a segment of the first stream stored in the memory sub-system and a tail pointer identifying a location in the first log buffer storing a second logical address used in an end of the first stream.

12. The computing system of claim 11, wherein the portion of the sequence is identified, based on the head pointer, to start from the first logical address and having a count of logical addresses, in the sequence, storing no less than twice a storage capacity of the superblock size.

13. The computing system of claim 12, further comprising:

updating the head pointer to identify a location in the first log buffer storing a third logical address that follows the portion in the first stream.

14. The computing system of claim 13, wherein the first log buffer has a predetermined size; and the host system is configured to trim the first stream in response to the first log buffer being full; and wherein after updating the head point to free up a portion of the first log buffer before the head pointer, the host system is further configured to move the tail pointer to a beginning of the first log buffer to use the first log buffer in a circular way.

15. The computing system of claim 11, wherein the sequence is recorded in the first log buffer as one or more ordered ranges of logical addresses.

16. The computing system of claim 15, further comprising:

updating a range of logical addresses identified by the tail pointer to include one or more logical addresses in response to a request to write at the one or more logical addresses being added to the first stream and the one or more logical addresses being sequential to the range of logical addresses identified by the tail pointer;

wherein the range of logical addresses is a range of logical block addressing (LBA) addresses.

17. A non-transitory computer storage medium storing instructions which, when executed in a computing system, causes the computing system to perform a method, the method comprising:

sending, by a host system to a memory sub-system, a stream of write commands, without an identification of a zone having a predetermined size in a namespace, to cause the memory sub-system to store data of the write commands into superblocks in the memory sub-system;

determining, by the host system, a superblock size in the memory sub-system;

identifying, by the host system and based on the superblock size, logical addresses; and sending, by the host system to the memory sub-system, commands to erase data from the logical addresses identified according to the superblock size to be sufficient to free at least one superblock, wherein the memory sub-system is configured to not reclaim a superblock partially erased by the host system.

18. The non-transitory computer storage medium of claim 17, wherein the data at the logical addresses has a size that is at least twice of the superblock size.

19. The non-transitory computer storage medium of claim 18, wherein the method further comprises:

serializing, by the host system, the write commands in the stream according to logical addresses of the write commands.

20. The non-transitory computer storage medium of claim 17, wherein the method further comprises:

tracking, by the host system, a sequence of logical addresses issued in the stream in a random order; and determining, by the host system according to the sequence, logical addresses mapped to an entire superblock.

* * * * *